United States Patent [19]

Carney et al.

[11] 4,409,108

[45] Oct. 11, 1983

[54] LUBRICATING COMPOSITION FOR WELL FLUIDS

[75] Inventors: Leroy L. Carney, New Caney; Royal E. Loftin, Houston; Thomas E. Anderson, Houston; Guillermo Vasquez, Houston, all of Tex.

[73] Assignee: Halliburton Company, Duncan, Okla.

[21] Appl. No.: 155,885

[22] Filed: Jun. 2, 1980

[51] Int. Cl.$^3$ .............................................. C09K 7/02
[52] U.S. Cl. .............................. 252/8.5 C; 252/8.55 R
[58] Field of Search ............. 252/8.5 C, 8.5 P, 8.55 R

[56] References Cited

U.S. PATENT DOCUMENTS

| | | | |
|---|---|---|---|
| 3,007,864 | 11/1961 | Aldophson et al. | 252/8.5 |
| 3,047,493 | 7/1962 | Rosenberg | 252/8.5 |
| 3,047,494 | 7/1962 | Browning | 252/8.5 |
| 3,712,393 | 1/1973 | Sheldahl et al. | 252/8.5 X |
| 3,761,410 | 9/1973 | Mondshine et al. | 252/8.5 |
| 4,064,055 | 12/1977 | Carney | 252/8.5 |
| 4,108,779 | 8/1978 | Carney | 252/8.5 |
| 4,181,617 | 1/1980 | Elrod | 252/8.5 |

*Primary Examiner*—Herbert B. Guynn
*Attorney, Agent, or Firm*—Robert A. Kent; Thomas R. Weaver

[57] ABSTRACT

Particular combinations of two or more $C_{12}$–$C_{22}$ fatty acid esters of $C_2$–$C_{12}$ polyhydroxy compounds with $C_2$–$C_{12}$ alcohol and a masking agent provide lubricants for aqueous well fluids having synergistic lubricity and cake conditioning properties in reducing torque and sticking in wells for natural resource fuel and/or mineral materials.

12 Claims, No Drawings

LUBRICATING COMPOSITION FOR WELL FLUIDS

The processes and composition of this invention relate to conditioning of the well fluid and bore hole wall to reduce drag. Such wells are used to develope, produce and treat natural resource bearing formations such as minerals, thermal energy, hydrocarbons, other carbonaceous materials and other materials.

In one method of drilling such a well, referred to as rotary drilling, a drill bit is rotated at the end of a drill pipe or a drill string. The weight on the drill bit is varied and a drilling fluid is circulated down through the drill string, out through the bit and back up through the annulus between the drill string and well bore or casing and then through mud processing equipment and to storage pits. This drilling fluid is circulated to lubricate the drilling bit, lift cuttings out of the well, condition the formations through which the well passes and to maintain pressure on these formations. Typically, the mud is principally water, liquid hydrocarbon or mixtures thereof and numerous additives or components of this drilling mud are mixed with the drilling mud at the beginning and during the drilling or treating process. These additives are used to overcome certain problems or to obtain certain treatments during and at different stages of the particular operation.

One problem frequently encountered during the drilling is a high drag or friction condition which resists the rotation of the drilling string while drilling or which resists vertical movement or reciprocation of the drilling string or other tools in or out of the well bore. Additives used to reduce this problem are typically referred to as lubricants because they are compared to or considered analogous to the use of grease and oils in machinery where you have sliding metal to metal contact and, typically, oils and other such compositions have been used as lubricants in well fluids. For example, the compositions described in U.S. Pat. Nos. 3,007,864; 4,064,055; 4,108,779 and 4,181,617. Each of these additives or lubricants has certain advantages and disadvantages and is used under certain conditions.

A new and improved combination of ingredients have been discovered which produce an unexpected synergism in the reduction of torque, drag or "friction" between the drilling string, tools and other articles typically used in a well bore and the well bore wall. In order to accomplish this reduction in drag, the lubricant must act to condition not only the drilling fluid but also the well bore wall and even perhaps the surfaces of metal drill string and metal articles which are typically passed through or used in such wells.

By this invention there is provided a process for reducing friction between a rotatable metal article and an adjacent surface comprising applying as a lubricating medium an aqueous fluid containing up to about 5% by weight of an additive comprising a mixture of a masking agent; a low molecular weight alcohol derived from a $C_2$–$C_{12}$ hydrocarbon; and at least one ester of oleic acid and at least one hydroxyl compound, with said hydroxyl compound having at least two hydroxyl groups and being derived from a $C_2$–$C_7$ hydrocarbon.

Yet another version of the invention would be a process of moving a metal surface in a well containing an aqueous fluid wherein a step used is characterized by mixing a conditioning agent with said aqueous fluid to treat the well fluid and to reduce friction between said metal surface and well bore, wherein said conditioning agent comprises a synergistic mixture of a masking agent; a low molecular weight water soluble alcohol derived from $C_2$–$C_{12}$ hydrocarbon; and at least one, and preferably two oleates, which are the reaction product of oleic acid and a metal ion of magnesium (Mg), strontium (Sr), zinc (Zn), or cadmium (Cd); at least one hydroxyl compound derived from $C_2$–$C_7$ hydrocarbon having at least two hydroxyl groups per molecule or a mixture thereof. In other words, the esters or oleates can be one oleate derived from the reaction of oleic acid and one hydroxyl or polyhydroxyl compound which can be considered a $C_2$–$C_7$ hydrocarbon having hydroxyl group substituents. The oleates can also be a combination or mixture of more than one ester derived from the reaction of oleic acid and two or more hydroxyl compounds fitting the above formula. The oleates can also be a mixture of the reaction product of oleic acid with one or more hydroxyl compounds as described above plus the oleate produced by the reaction of oleic acid and a metal base containing the metal ions described herein.

Synergistic effects have also been discovered for subcombinations of the above components, in that the mixture of certain oleates and certain alcohols produce a synergistic lubricant as well as the overall combination of the components described herein. Thus, the lubricant composition and the process of using it, of this invention covers both one preferred class of lubricant compositions which have four or more separate components as described herein and also the subcombinations which could comprise two or three components having synergistic effects described herein.

These lubricant compositions are useful as lubricants or well fluid treating additives to reduce the friction, drag, rotary torque, vertical drag, differential sticking or any other resistance to movement of the drill pipe or articles used in the well bore. Typically, these articles or tools are metal cylinders or cylindrical shapes that are run into the well for a particular operation, treatment, adjustment or measurement. These tools or articles also frequently have non-metalic parts so that any tool or article typically used in the well would be covered herein. The rotary drag or torque is the resistance to turning or rotation of the drill string or tools in the well. Drag also includes differential and reciprocal drag which would include high initial resistance after the drill pipe or tool has been stationary for a period of time as well as vertical or reciprocal movement of the tool or drill string. For example, vertical resistance is frequently encountered with tools or drill string when they are being run into the well or removed from the well such as during a trip in which all of the drill string and bit are removed from the well either to inspect the drill string or to change a portion thereof. The tools and articles with which this lubricant could be used include drill pipe, casing, cable tools, wire line operations, testing tools, valves, sucker rods, pump mechanism and the like.

The well fluid with which this lubricant is typically used is considered an aqueous fluid that can be used for drilling, work over, completion, as a packer fluid, or any other operation concerning a well. The well fluid should contain a substantial portion of water, that is at least 10%, which significantly contacts the drill string and well bore. Other components can be present such as hydrocarbons, oil, brine, soluble salts, insoluble particles, both natural and synthetic viscosifiers, dispersants, and other typical well fluid additives. However, the lubricant is not usually necessary with an oil base mud and under some circumstances will form a soap in the presence of certain calcium salts. Therefore, the compatibility with other components should be tested in view of the disclosure set forth herein.

In yet another version, the process of this invention can be considered one for reducing the friction between a moveable metal surface and an adjacent surface comprising applying as a lubricating medium an aqueous fluid containing up to about 5% by weight of a mixture comprising: (1) a masking agent; and (2) at least one ester of oleic acid and at least one hydroxyl compound, said hydroxyl compound having at least two hydroxyl groups; said hydroxyl compound being derived from a $C_2-C_{12}$ hydrocarbon, said hydroxyl compound being defined by the formula:

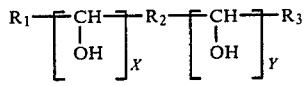

wherein
$R_1$ and $R_3$ are independently hydrogen, methyl radicals, methylene radicals or a combination thereof containing 0-5 carbon atoms;
$R_2$ can be non-existent or methyl radicals, methylene radicals or a combination thereof containing 0-5 carbon atoms;
X and Y are independently whole integers with their sum equal to at least two and the total number of carbon atoms in the formula in the range of about 2-7; and
a low molecular weight alcohol derived from $C_2-C_{12}$ hydrocarbon said alcohol being defined by the formula:

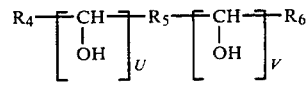

wherein
$R_4$ and $R_6$ are independently hydrocarbon, methyl radicals, methylene radicals or a combination thereof containing 0-5 carbon atoms, $R_5$ can be non-existent or methyl radicals, methylene radicals or a combination thereof containing 0-5 carbon atoms;
U or V are independently whole integers with their sum equal to at least one, with the ratio of hydroxyl radicals to carbon atoms being at least 1:5; the total number of carbon atoms in the formula in the range of about 2-12 and the alcohol being water soluble.

It will be understood by those skilled in the art that the radicals or groups present and the structure of the compound must be selected and arranged to comply with the valences and other chemical requirements of the components and resulting compound.

In yet another version, the invention can be considered a composition such as used in an aqueous well fluid containing an additive for reducing friction between the bore wall of said well and a metal article, wherein the additive is characterized as a mixture of at least one ester of oleic acid and at least one polyhydroxyl compound derived from a $C_2-C_{12}$ hydrocarbon, a low molecular weight alcohol derived from at least one $C_2-C_{12}$ hydrocarbon and a masking agent. More preferrably, the additive can be considered one for reducing friction between the surface of a metal article and the well bore wall in a well containing an aqueous well fluid with the additive comprising a synergistic mixture of a masking agent, a low molecular weight alcohol derived from at least one $C_2-C_{12}$ hydrocarbon, a first ester or oleate of oleic acid and at least one polyhydroxyl compound derived from a $C_2-C_7$ hydrocarbon and a second oleate of oleic acid with magnesium ion, or with at least one hydroxyl compound derived from $C_2-C_4$ hydrocarbon having at least two hydroxyl groups per molecule with said second oleate having at least two oleic acid groups per oleate molecule, wherein said first and second oleates are present in approximately equal amounts and said alcohol is present in an amount equal to or greater than the mixture of oleates.

The masking agent used in the composition of this invention is considered essential and performs the function of a deodorant, perfume or aromatic compound to make certain preferred class combinations tolerable or marketable and to overcome the odors without significantly adversely affecting lubricity and the rheology properties of the well fluid. Since the masking agent is typically only present in trace amounts in the well fluid and up to about 5% or minor amounts of less than 10% in the lubricant mixture, its contribution or synergistic effect on the other properties of the lubricant mixture or well fluid are not readily apparent. Normally the masking agent would be present in the lubricating mixture in less than about 5% by weight. The masking agent can be any one or more of several aromatic compounds or odor producing or odor supressing agents. The masking agent essentially supplies a means for suppressing the odor of certain components and for imparting a more pleasant odor to the lubricant composition and well fluid using it. These types of aromatic compounds are described in the references, such as THE CONDENSED CHEMICAL DICTIONARY, 8th Edition, as essential oils, terpeneless oil, terpene, and the like. Both synthetic and natural aromatic compounds can be used. Such natural agents are normally a volatile oil or liquid derived from parts of plants such as the leaves, stem, flower, fruit or twigs. The naturally occurring aromatic compounds often contain principally terpenes, however, some of them contain esters. Preferred aromatic compounds would have a pungent, strong odor and be soluble at least to some extent in alcohols and/or fatty acids. Some may even be soluble in water. They should also have a specific gravity in the range of about 0.850-1.10. Specific compounds and natural essential oils which can be used include dipentene, pinene, mycene, camphor, menthol, barenol, terpineol, d-limonene, gamma-terpinene, carvone, paracymene, bergamot, geranium, petitgrain, lime, turpentine oil, wintergreen, methylsalicylate, bitter almond, benzaldehyde, hydrocyanic acid, oleoresin, balsam, linalylacetate, linalool, geraniol, citronelloe, citral, terpinol, methyl anthanilate, and the like. Preferred masking agents include at least one of the natural essential oils or parametic constituents thereof, especially those which have been refined to remove the unsaturated components which typically make the essential oils sensitive to light, air and other reactions which cause spoilage. One class of preferred masking agents includes those having a substantial concentration of limonene, linalyl acetate, linalool, or mixtures of two or more and which is soluble in alcohol, an organic acid and/or fatty acid such as bergamot oil, geranium oil, lime oil, petitgrain oil and neroli oil.

The low molecular weight alcohols which can be used in this invention include those having from 2-12 carbon atoms or being derived from a hydrocarbon having 2-12 carbon atoms. "Derived from" as used herein means that the alcohol or composition being described can be described or defined by the hydrocarbon having the same number of carbon atoms from which it is "derived" by substitution onto one or more of the carbon or other reactive atoms in the hydrocarbon. Other substituents can be tolerated as long as they are compatible with the lubricant composition and the well fluid in which it is used. The alcohol or hydrocarbon from which it is derived can be aliphatic, aromatic, acyclic, cyclic, saturated, unsaturated, linear, branched, or any of the isomers or combinations thereof. The alcohol should be water soluble to some extent and at least form a stable aqueous dispersion with the other components of the lubricant mixture. A preferred class of alcohols are those having 7-10 carbon atoms and which are substantially linear or branched to a minor degree. The hydroxyl groups can be attached to primary, secondary or tertiary carbons or other suitable atoms. The alcohols can be considered primary alcohols or diols, or triols, or polyols. Examples of alcohols and diols include ethanol, ethylene glycol, glycerol, propylene glycol, butanol, butane diol, butane triol, butane tetraol, amyl alcohol, butane diol, hexanol, hexane diol, hexane triol, hexane tetraol, hexane pentaol, hexane hexol, sucrose, sorbitol, heptanol, heptane diol, heptane triol, heptane tetraol, heptane pentaol, heptane hexaol, heptane heptiol, octyl alcohol, and all of its homologs from the diol through the octanol, nonyl alcohol, including its homologs from nonane diol through nonane nonaol, decyl alcohol, including its homologs, undecanol, including its homologs and dodecanol including its homologs. Isomers of the primary alcohols and the homologs are also included within the class of and terms for the basic alcohol, such as for a preferred class beginning with heptal alcohol or heptanol, the class would include the linear isomer heptanol-1; as well as the other isomers such as 2,2,3-trimethylbutanol-3; 2,3-dimethyl-pentanol-3; 2,4-dimethyl-pentanol-2; 2,4-dimethylpentanol-3; 3-ethyl-pentanol-2; 3-ethyl-pentanol-3; 2-methyl-hexanol-1; 2-methyl-hexanol-2; 2-methyl-hexanol-3; 2-methyl-hexanol-4; 2-methyl-hexanol-5; 2-methyl-hexanol-6; 3-methyl-hexanol-3; 3-methyl-hexanol-4; heptanol-2; and heptanol-4. The isomers and isomers of homologs for the other alcohols such as octyl alcohol, decyl alcohol, undecanol, and dodecanol are given in handbooks such as THE TENTH EDITION OF LANG'S HANDBOOK OF CHEMISTRY, published by McGraw-Hill and THE HANDBOOK OF CHEMISTRY AND PHYSICS as published by the Chemical Rubber Publishing Company which are incorporated herein by reference to the extent necessary. At least one or a mixture of the alcohols are present in the lubricant composition of this invention in a substantial amount which means about 10% or more and preferrably in about 10-60% or 30-90% by weight of the total lubricant mixture. The alcohols are also preferrably present in an amount equal to or greater than the amount of oleates or mixture of oleates.

The oleates or esters or one or more oleates which are key components of the lubricating compositions of this invention and used in the processes thereof, are the reaction product of oleic acid and a metal base or a polyhydroxyl compound. The polyhydroxyl compound can be a diol, triol, tetraol, or any of the homologs having 2-12 carbon atoms or derived from a hydrocarbon having 2-12 carbon atoms. "Derived from" as used herein has the same meaning as for the alcohols as set forth herein. Preferred classes of polyhydroxyl compounds have 2-7 carbon atoms or more preferrably 2-4 carbon atoms. In the lubricating compositions, the oleates may be derived from one or the same polyhydroxyl compound or they may be derived from more than one polyhydroxyl compound. In one class of preferred oleates the oleates are different polymer forms of the same polyhydroxyl compound and oleic acid, that is, the monooleate, dioleate, trioleate and the like. In one preferred lubricating composition, the oleates or the monooleate and dioleate of the same $C_2$-$C_4$ polyhydroxyl compound. In this preferred lubricating composition these oleates are present in substantial and approximately equal amounts. For this preferred class of lubricating compositions, when at least two oleates are present in substantial amounts, others can also be present and are not necessarily excluded. The oleates should be present in substantial amounts in the lubricating composition which means at least about 10% by weight and preferrably in an amount of about 5-60% by weight and more preferrably 5-40% or better yet 10-30% by weight. The oleic acid used to react with the polyhydroxy compounds or organic bases to produce the oleates for the lubricating compositions of this invention can be either relatively pure oleic acid or a crude mixture of oleic acids or oleic acid with other components such as other similar fatty acids, diluents relatively inert long chain hydrocarbons and and the like. Likewise, the oleic acid can contain minor amounts of polymerized oleic or other fatty acids such as the dimers, trimers, and the like.

For producing the oleates or esters used in the lubricating composition of this invention the oleic acid can be in the form of acid equivalents which react to produce the esters and oleates either directly or through a series of steps to result in the same type of oleate or ester. For example, the acid equivalents such as anhydrides, esters which hydrolyze to produce the acid, salts which will react to produce the oleic acid and other equivalents. The equivalents can be used either in a separate reaction to produce the oleic acid or in the same reaction or mixture in which the oleate or ester is produced.

Examples of polyhydroxyl or hydroxyl compounds which can be used to form the oleates or esters for the compositions of this invention are the diols, triols, tetraols, and the like which can contain primary, secondary and tertiary hydroxyl groups. Such compounds include ethylene glycol, glycerol, polyethylene glycol, butane diol, trimethylene glycol, tetramethylene glycol, amyl diol, pentane diol. These also include the other isomers and homologs thereof, glucose, hexane diol, hexane triol, heptane diol, the di- and polyols described as suitable for the alcohol class as set forth herein as well as the other isomers and homologs thereof. The polyhydroxyl compounds can contain other substituents which do not significantly alter the reactivity of at least two hydroxyl groups with oleic acid, do not substantially alter the hydrophobic-hydrophilic balance of the polyhydroxyl compound or the resulting esters and which do not result in any substantial incompatibility for the polyhydroxyl compound or resulting esters.

The lubricating composition or additives of this invention should be used in the aqueous drilling fluid by simply mixing the additive with the drilling fluid as it is circulated to uniformly disperse and mix the lubricant with the drilling fluid. This mixing and circulating can be accomplished as the well fluid is used in the well for either drilling, completion or any other typical function. The lubricant can also be mixed with the mud in storage tanks or pits using conventional means such as propellor mixers. The lubricant should be present in an amount up to about 5% or about 2-6 lbs/bbl of well fluid. This is a 42 gallon barrel and a pound equivalent to 454 grams. The lubricating composition can also be present in the well fluid in an amount up to about 5% by weight.

The various preferred compositions and methods of making and using the compositions and processes described herein are illustrated and set forth in the descriptive information, examples and tables.

LUBRICITY TEST

Torque or drag reduction effectiveness is measured using two methods. A lubricity coefficient is measured by Lubricity Coefficient Instrument with the method described in API Method RP-13B. It registers the friction coefficient on the motor ampmeter calibrated to indicate torque in inch-pounds. The motor drives or rotates a steel ring against a stationary steel block. A 150 pound force load is applied between the ring and block. The instrument is calibrated with tap water for a coefficient of about 0.33. The rotating ring and block are emersed in water or the fluid being tested until the reading stabilizes or the specimen fails. The lower the lubricity coefficient the better lubricating or torque reduction properties of the fluid sample.

The second friction measurement uses Falex Meter which is a rotating pin and V-block model. A steel pin 1.25 inches by 3/16 inches in diameter is secured concentrically in a driving shaft by a 1/8 inch diameter brass shear pin. The steel pin is clamped between two V-notched cylindrical blocks held against the rotating steel pin by pivoted arms which are adjusted to apply a load of 700 pounds by the pivoted arms. The pin is rotated at 180 RPM and both the rotating pin and V-blocks are emersed in the fluid being tested which is cooled to maintain ambient temperature. Each sample is tested according to ASTM Method D-2670-67. The power required to rotate the steel pin indicates the torque on the pin. If the fluid fails as a lubricant, the steel pin can fuse to the V-blocks or the brass pin can shear ending the test. The time and nature of failure, torque adjustments (number of teeth rotated to maintain 700 pound load) and amperage or torque indicate the efficiency of the fluid being tested. The longer the test runs and lower the number of teeth adjustments for the sample the better the sample is in reducing torque or drag or the more effective the fluid is in lubricating the steel pin and blocks.

STICKING TESTS

Stick-O-Meter tests determine the cake building efficiency and the attraction and resistance to movement between that cake and a stainless steel surface. The test is run using a stainless steel pressure cell adapted to hold number 50 Whatman filter paper on a 6.35 cm diameter screen. The cell has a diameter of about 3½ inches and holds at least 175 cc of fluid to be tested. A plate which just covers the 6.35 cm filter paper is positioned above the screen and filter paper so that it can be moved down against the filter paper and rotated about a shaft to determine the torque in inch-pounds required to turn the plate when it adheres to the filter cake.

To test the cake building efficiency and sticking tendency of a fluid a fluid sample is sealed in the cell and 500 psi gas pressure is applied to the fluid. After filtrate has run for 30 minutes the plate is pushed down against the cake on the filter paper and held down for 3 minutes using a lever and weight which applies about 48 pounds to the shaft of the plunger or plate. After 3 minutes the weight is released. If the plunger pops up filtrate is allowed to run for an additional 5 minutes and the plunger adhesion tested again. If the plunger pops up again, filtrate is allowed to run for repeated 10 minute intervals until the plate sticks to the cake. When the plate begins to stick to the filter cake the resistance to movement is measured in inch-pounds after each interval using a standard torque wrench on the plate shaft. The torque is measured for repeated intervals until the torque is constant for 3 consecutive readings.

RHEOLOGICAL TESTS AND FLUID LOSS

Rheological properties of each fluid sample are measured using a direct reading rotational viscometer such as a Fann Model 35 or an IMCO viscometer as described in API Method RP-13B. Viscosity of the fluid in centipoise is measured directly by immersing the viscometer sleeve and bob into the fluid. The sleeve is rotated at 3 and 600 RPM and the fluid drag on the bob produces a reading in centipoise. The 3 RPM reading setting is used to determine 10 second and 10 minute gel strengths. Plastic viscosity is calculated by subtracting the 300 RPM reading from the 600 RPM reading. Yield point is the 300 RPM reading minus the plastic viscosity. Apparent viscosity equals the 600 RPM reading divided by 2. Fluid loss or API filtrate at 100 psi in milliliters (ml) per thirty minutes and high temperature, high pressure fluid loss (HTHP) in ml at 300° F. and 500 psi are measured using 9 centimeter (cm) and 6.35 cm number 50 Whatman filter paper with the apparatus and procedure described in the API Method 13B. Other tests such as pH, density (lb/gal, ppg) etc., are also standard.

Samples of base mud were prepared and mixed with various additives and mixtures of additives. The lubricity, rheology and other properties of the base mud and base mud mixed with the additives were tested. The results of those tests are tabulated herein. Most of the samples contained additives at a total concentration of two (2) pounds per 42 gallon barrel. For the base mud having a density of about 10.2 ppg (pounds per gallon), the 2 ppb concentration was about 0.467% by weight. Tests at other concentrations are indicated with the data. For the tests the base mud formulation is essentially the same; however, the amount of barite (barium sulfate) is varied to vary the density of the base mud in the range of about 9-12 ppg as indicated in the data. For test samples 1 gm per 350 cc water or mud is equivalent to 1 pound per 42 gallon barrel of mud.

TABLE I

| | Screening Tests |
|---|---|
| | Test No. 1 |
| Sample No. 1 | Base Mud - 350 cc - tap water |
| | 10 ppb - NaCl |
| | 20 ppb - bentonite clay |

TABLE I-continued

Screening Tests 15 ppb - calcium carbonate
24 ppb - barite
Falex Test - Steel pin sheared after 9 minutes at 700 lbs.

Stick-O-Meter

| Lubricity Test* | Time Min. | Fluid Loss mls. | Torque In.-Lbs. |
|---|---|---|---|
| Initial | .32 | 30 | 41.0 | — |
| 1 Min. | .38 | 33 | 43.2 | — |
| 5 Min. | .42 | 38 | 44.2 | — |
| | | 48 | 46.4 | Stick |
| | | 58 | 47.8 | 150 |
| | | 68 | 52.2 | 150 |
| | | 78 | 53.4 | 150 |

Test No. 2
Sample No. 2   Base + 2 ppb 80% mixture of two phosphate esters
20% oleic acid
Falex Test - Steel pin sheared and welded after 4 minutes at 700 lbs.
Formation solidified after 24 hours so no further tests conducted.

Test No. 3
Sample No. 3   70% mixture of two phosphate esters
20% oleic acid
10% A.M.P. (2-amino-2-methyl-1-propanol)
Solidified immediately. No tests conducted.

Test No. 4
Sample No. 4   50% glycerol monooleate
10% T.E.A. (triethylamine)
34% $H_2O$
6% stearic acid
Separated after 30 minutes. No tests conducted.

Test No. 5
Sample No. 5   50% mixture of $C_8$-$C_{12}$ hydrophilic phosphate esters
10% T.E.A. (triethylamine)
34% $H_2O$
6% stearic acid
Separated after 30 minutes. No tests conducted.

Test No. 6
Sample No. 6   50% phosphate esters
10% T.E.A. (triethylamine)
34% $H_2O$
6% stearic acid
Separated after 30 minutes. No tests conducted.

Test No. 7
Sample No. 7   30% glycerol monooleate
20% mixture of $C_8$-$C_{12}$ hydrophilic phosphate esters
50% decyl alcohol ($C_{10}$)
5% aluminum stearate by weight
Separated immediately. No tests conducted.

Test No. 8
Sample No. 8   30% glycerol monooleate
20% mixture of $C_{18}$-$C_{22}$ lipophilic fatty acid phosphate esters
30% decyl alcohol ($C_{10}$)
20% $H_2O$
Separated when $H_2O$ was added. No tests conducted.

Test No. 9
Sample No. 9   20% glycerol monooleate
80% ethylene glycol
Separated immediately. No tests conducted.

Test No. 10
Sample No. 10   Mixture of $C_9$ alcohols
Falex Test - Steel pin sheared at 700 lbs. No further tests warranted.

Test No. 11
Sample No. 11   Base + 2 ppb 60% glycerol monooleate
40% mixture of $C_9$ alcohols
Falex Test - Steel pin sheared after 11 minutes at 700 lbs. No further tests.

Test No. 12
Sample No. 12   Base + 2 ppb 60% glycerol monooleate
40% decyl alcohol ($C_{10}$)
Falex Test - Brass pin sheared after 18 minutes at 700 lbs. No further tests.

Test No. 13
Sample No. 13   Base + 2 ppb 60% glycerol monooleate
40% decyl alcohol
5% stearic acid by weight
Falex Test - Brass pin sheared after 13 minutes at 700 lbs. No further tests.

Test No. 14
Sample No. 14   Base plus 2 ppb 60% glycerol monooleate
40% decyl alcohol
5% aluminum stearate by weight
Falex Test - Steel pin sheared and welded after 20 minutes at 700 lbs. No further tests.

Test No. 15
Sample No. 15   Base plus 6% Rape Seed Oil
Falex Test - Steel pin sheared and welded after 25 minutes at 700 lbs. No further tests.

Test No. 16
Sample No. 16   Base + 2 ppb 40% glycerol monooleate
60% rape seed oil
Falex Test - Steel pin sheared after 12 minutes at 700 lbs. No further tests.

Test No. 17
Sample No. 17   Base + 2 ppb 30% glycerol monooleate
10% oleic acid
60% rape seed oil
Falex Test - Steel pin sheared after 8 minutes at 700 lbs. No further tests.

Test No. 18
Sample No. 18   Base + 2 ppb 30% glycerol monooleate
30% rape seed oil
40% decyl alcohol ($C_{10}$)
Falex Test - Steel pin sheared and welded after 14 minutes at 700 lbs. No further tests.

Test No. 19
Sample No. 19   Base + 2 ppb 40% glycerol monooleate
60% mixture of $C_9$-$C_{11}$ alcohols
Falex Test - Steel pin sheared after 13 minutes at 700 lbs. No further tests.

Test No. 20
Sample No. 20   Base + 2 ppb 50% oleic acid dimer
50% $C_8$ alcohol
Falex Test - Steel pin sheared at 700 lbs. No further tests.

Test No. 21
Sample No. 21   Base + 2 ppb 40% oleic acid dimer
60% $C_8$ alcohol
Falex Test - Steel pin sheared at 700 lbs. No further tests.

Test No. 22
Sample No. 22   Base + 2 ppb 60% oleic acid dimer
40% $C_8$ alcohol
Falex Test - Steel pin sheared at 600 lbs. No further tests.

Test No. 23
Sample No. 23   Base + 2 ppb 80% oleic acid
20% A.M.P. (2-amino-2-methyl-1-propanol)
Falex Test - Ran 1 hour at 700 lbs.; 60 teeth take up. Excessive foaming in mud. No further tests.

Test No. 24
Sample No. 24   Base + 2 ppb 85% oleic acid
15% A.M.P. (2-amino-2-methyl-1-propanol)
Falex Test - Shear type failure after 7 minutes at 700 lbs. No further tests.

Test No. 25
Sample No. 25   Base + 2 ppb 25% oleic acid
75% A.M.P. (2-amino-2-methyl-1-propanol)
Falex Test - Ran 1 hour at 700 lbs.; 88 teeth take up. Excessive foaming in mud. No further tests.

Test No. 26
Sample No. 26   Base + 2 ppb 50% oleic acid

TABLE I-continued

Screening Tests

50% A.M.P. (2-amino-2-methyl-1-propanol)
Falex Test - Shear type failure after 27 minutes at 700 lbs. No further tests.

Test No. 27

Sample No. 27  Base + 2 ppb  50% glycerol dioleate
50% C$_8$ alcohol

Falex Test - Ran 1 hour at 700 lbs.; 55 teeth take up.

| Lubricity Test | | Stick-O-Meter Time Min. | Fluid Loss mls | Torque In.-Lbs. |
|---|---|---|---|---|
| Initial | .28 | 30 | 48.4 | — |
| 1 Min. | .26 | 33 | 49.6 | Stick |
| 5 Min. | .24 | 43 | 51.2 | 85 |
| | | 53 | 52.4 | 120 |
| | | 63 | 53.4 | 120 |
| | | 73 | 54.8 | 120 |

Test No. 28

Sample No. 28  Base + 2 ppb  50% glycerol dioleate
50% C$_8$ alcohol

Falex Test - Ran 1 hour at 700 lbs.; 61 teeth take up.

| Lubricity Test | | Stick-O-Meter Time Min. | Fluid Loss mls | Torque In.-Lbs. |
|---|---|---|---|---|
| Initial | .28 | 30 | 50.4 | — |
| 1 Min. | .26 | 33 | 51.6 | Stick |
| 5 Min. | .26 | 43 | 52.8 | 50 |
| | | 53 | 54.4 | 80 |
| | | 63 | 55.8 | 110 |
| | | 73 | 56.8 | 110 |
| | | 83 | 58.0 | 110 |

Test No. 29

Sample No. 29  Base + 2 ppb  50% sorbitan sesquioleate
50% C$_8$ alcohol

Falex Test - Ran 1 hour at 700 lbs.; 53 teeth take up.

| Lubricity Test | | Stick-O-Meter Time Min. | Fluid Loss mls | Torque In.-Lbs. |
|---|---|---|---|---|
| Initial | .24 | 30 | 49.6 | — |
| 1 Min. | .24 | 33 | 51.0 | Stick |
| 5 Min. | .20 | 43 | 52.2 | 50 |
| | | 53 | 53.6 | 60 |
| | | 63 | 54.8 | 90 |
| | | 73 | 55.8 | 90 |
| | | 83 | 57.0 | 90 |

Test No. 30

Sample No. 30  Base + 2 ppb  30% sorbitan sesquioleate
70% C$_8$ alcohol

Falex Test - Ran 1 hour at 700 lbs.; 56 teeth take up.

| Lubricity Test | | Stick-O-Meter Time Min. | Fluid Loss mls | Torque In.-Lbs. |
|---|---|---|---|---|
| Initial | .24 | 30 | 48.8 | — |
| 1 Min. | .22 | 33 | 49.8 | Stick |
| 5 Min. | .24 | 43 | 51.4 | 50 |
| | | 53 | 52.6 | 80 |
| | | 63 | 53.6 | 90 |
| | | 73 | 54.8 | 100 |
| | | 83 | 55.6 | 100 |
| | | 93 | 56.6 | 100 |

Test No. 31

Sample No. 31  Base + 2 ppb  40% oleic acid
10% A.M.P. (2-amino-2-methyl-1-propanol)
50% ethylene glycol Falex Test - Ran 1 hour at 700 lbs.; 58 teeth take up.

| Lubricity Test | | Stick-O-Meter Time Min. | Fluid Loss mls | Torque In.-Lbs. |
|---|---|---|---|---|
| Initial | .32 | 30 | 32.5 | — |
| 1 Min. | .32 | 33 | 35.0 | — |
| 5 Min. | .32 | 38 | 37.5 | — |
| | | 48 | 41.5 | — |
| | | 58 | 45.0 | — |
| | | 68 | 49.5 | Stick |
| | | 78 | 50.0 | 65 |
| | | 88 | 50.2 | 105 |
| | | 98 | 50.4 | 105 |
| | | 108 | 50.8 | 105 |

Test No. 32

Sample No. 32  Base + 2 ppb  20% glycerol dioleate
20% glycerol monooleate
60% C$_8$ alcohol Falex Test - Ran 1 hour at 700 lbs.; 42 teeth take up.

| Lubricity Test | | Stick-O-Meter Time Min. | Fluid Loss mls | Torque In.-Lbs. |
|---|---|---|---|---|
| Initial | .20 | 30 | 46.0 | — |
| 1 Min. | .18 | 33 | 48.5 | Stick |
| 5 Min. | .14 | 43 | 50.5 | 20 |
| | | 53 | 51.5 | 35 |
| | | 63 | 52.0 | 55 |
| | | 73 | 52.5 | 55 |
| | | 83 | 52.7 | 55 |
| | | 93 | 53.0 | 55 |

Test No. 33

Sample No. 33  Base + 2 ppb  15% glycerol dioleate
15% glycerol monooleate
10% coco ester
60% C$_8$ alcohol Falex Test - Ran 1 hour at 700 lbs.; 49 teeth take up.

| Lubricity Test | | Stick-O-Meter Time Min. | Fluid Loss mls | Torque In.-Lbs. |
|---|---|---|---|---|
| Initial | .20 | 30 | 49.5 | — |
| 1 Min. | .20 | 33 | 41.0 | Stick |
| 5 Min. | .16 | 43 | 42.0 | 50 |
| | | 53 | 43.5 | 75 |
| | | 63 | 44.5 | 100 |
| | | 73 | 45.0 | 100 |
| | | 83 | 45.2 | 100 |

Test No. 34

Sample No. 34  Base + 2 ppb  20% glycerol trioleate
20% glycerol monooleate
60% C$_8$ alcohol Falex Test - Ran 1 hour at 700 lbs.; 36 teeth take up.

| Lubricity Test | | Stick-O-Meter Time Min. | Fluid Loss mls | Torque In.-Lbs. |
|---|---|---|---|---|
| Initial | .22 | 30 | 35.0 | — |
| 1 Min. | .18 | 33 | 36.0 | Stick |
| 5 Min. | .14 | 43 | 37.0 | 50 |
| | | 53 | 37.5 | 85 |
| | | 63 | 38.0 | 95 |
| | | 73 | 38.5 | 95 |
| | | 83 | 39.2 | 95 |

Test No. 35

Sample No. 35  Base + 2 ppb  15% sorbitan sesquioleate
15% glycerol monooleate
10% coco ester
60% C$_8$ alcohol

| Lubricity Test | | |
|---|---|---|
| Initial | .26 | No further tests warranted. |
| 1 Min. | .24 | |
| 5 Min. | .22 | |

Test No. 36

Sample No. 36  Base + 2 ppb  20% sorbitan sesquioleate
20% glycerol monooleate
60% C$_8$ alcohol

| Lubricity Test | | |
|---|---|---|
| Initial | .24 | No further tests warranted. |
| 1 Min. | .22 | |
| 5 Min. | .18 | |

TABLE I-continued

Screening Tests

Test No. 37

Sample No. 37: Base + 2 ppb 20% glycerol dioleate
20% glycerol monooleate
60% $C_6$ alcohol

Lubricity Test

| | | |
|---|---|---|
| Initial | .22 | No further tests warranted. |
| 1 Min. | .22 | |
| 5 Min. | .18 | |

Test No. 38

Sample No. 38: Base + 2 ppb 20% glycerol monooleate
20% coco ester
60% $C_8$ alcohol

Test No. 39

Sample No. 39: Base + 2 ppb 60% glycerol monooleate
40% $C_8$ alcohol

Lubricity Test

| Sample | Base | Base + Sample 38 | Base + Sample 39 | Phosphate Esters | Base + Sample 32 |
|---|---|---|---|---|---|
| Initial | .32 | .26 | .26 | .34 | .20 |
| 1 Minute | .38 | .24 | .28 | .34 | .18 |
| 5 Minutes | .42 | .18 | .26 | .34 | .14 |

Falex Tests

Base - Steel pin sheared after 9 minutes at 700 lbs.
Base + Sample 32 - Ran 1 hour at 700 lbs.; 42 teeth take up.
Base + Sample 38 - Ran 1 hour at 700 lbs.; 51 teeth take up.
Base + Sample 39 - Ran 1 hour at 700 lbs.; 51 teeth take up.
Base + phosphate esters - Weld type failure at 700 lbs.

Stick-O-Meter

| | Base | | | Base + Sample 38 | |
|---|---|---|---|---|---|
| Time Min. | Fluid Loss mls | Torque In.-Lbs. | Time Min. | Fluid Loss mls | Torque In.-Lbs. |
| 30 | 41.0 | — | 30 | 47.0 | — |
| 33 | 43.2 | — | 33 | 49.0 | Stick |
| 38 | 44.2 | — | 43 | 50.0 | 70 |
| 48 | 46.4 | Stick | 53 | 51.0 | 100 |
| 58 | 47.8 | 150 | 63 | 51.5 | 125 |
| 68 | 52.2 | 150 | 73 | 51.7 | 125 |
| 78 | 53.4 | 150 | 83 | 52.0 | 125 |

| | Base + Phosphate Esters | | | Base + Sample 32 | |
|---|---|---|---|---|---|
| Time Min. | Fluid Loss mls | Torque In.-Lbs. | Time Min. | Fluid Loss mls | Torque In.-Lbs. |
| 30 | 64.0 | — | 30 | 37.0 | — |
| 33 | 66.5 | Stick | 33 | 38.5 | Stick |
| 43 | 70.0 | 50 | 43 | 39.8 | 85 |
| 53 | 70.0 | 85 | 53 | 40.0 | 125 |
| 63 | 70.2 | 95 | 63 | 40.7 | 150 |
| 73 | 73.0 | 110 | 73 | 41.0 | 150 |
| 83 | 74.0 | 110 | 83 | 41.2 | 150 |

| Base + Sample 39 | | |
|---|---|---|
| Time Min. | Fluid Loss mls | Torque In.-Lbs. |
| 30 | 46.0 | — |
| 33 | 48.5 | Stick |
| 43 | 50.5 | 20 |
| 53 | 51.5 | 25 |
| 63 | 52.0 | 35 |
| 73 | 52.5 | 55 |
| 83 | 52.7 | 55 |
| 93 | 53.0 | 55 |

Test No. 40

Tests run at 2 ppb in the standard base mud for Falex, lubricity and Stick-O-meter testers.

Lubricity Tester

| Sample | Base | Base + Sample 32 | Base + Sample 33 | Base + Sample 34 |
|---|---|---|---|---|
| Initial | .32 | .20 | .20 | .22 |
| 1 Minute | .38 | .18 | .20 | .18 |
| 5 Minutes | .42 | .14 | .16 | .14 |

Falex Tests

Base - Steel pin sheared after 9 minutes at 700 lbs.
Base + Sample 32 - Ran 1 hour at 700 lbs.; 42 teeth take up.
Base + Sample 33 - Ran 1 hour at 700 lbs.; 49 teeth take up.
Base + Sample 34 - Ran 1 hour at 700 lbs.; 36 teeth take up.

Stick-O-Meter

| | Base | | | Base + Sample 32 | |
|---|---|---|---|---|---|
| Time Min. | Fluid Loss mls | Torque In.-Lbs. | Time Min. | Fluid Loss mls | Torque In.-Lbs. |
| 30 | 41.0 | — | 30 | 46.0 | — |
| 33 | 43.2 | — | 33 | 48.5 | Stick |
| 38 | 44.2 | — | 43 | 50.5 | 20 |
| 48 | 46.4 | Stick | 53 | 51.5 | 25 |
| 58 | 47.8 | 150 | 63 | 52.0 | 35 |
| 68 | 52.2 | 150 | 73 | 52.5 | 55 |
| 78 | 53.4 | 150 | 83 | 52.7 | 55 |
| | | | 93 | 53.0 | 55 |

| | Base + Sample 33 | | | Base + Sample 34 | |
|---|---|---|---|---|---|
| Time Min. | Fluid Loss mls | Torque In.-Lbs. | Time Min. | Fluid Loss mls | Torque In.-Lbs. |
| 30 | 39.5 | — | 30 | 35.0 | — |
| 33 | 41.0 | Stick | 33 | 36.0 | Stick |
| 43 | 42.0 | 50 | 43 | 37.0 | 50 |
| 53 | 43.5 | 75 | 53 | 37.5 | 85 |
| 63 | 44.5 | 100 | 63 | 38.0 | 95 |
| 73 | 45.0 | 100 | 73 | 38.5 | 95 |
| 83 | 45.2 | 100 | 83 | 39.2 | 95 |

*Expressed as Lubricity Coefficient

CONCLUSION

Sample 34 exhibited similar results on the lubricity tester, and slightly better results on the Falex tester, but was surpassed by Sample 32 on the Stick-O-Meter. Where Sample 34 had a torque of 95 inch-pounds, Sample 32 had a torque of 55 inch-pounds.

Sample 32 had no detrimental effects on the rheological properties of the various mud systems used in the tests. It exhibited lasting abilities in the low weight lignosulfonate mud system where it was static-aged 4 days at 300° F. and hot-rolled 4 days at 250° F. It showed good lubricating qualities after the 4 day tests with no detrimental effects to the mud system. It did, however, lower the HT-HP fluid loss from 58.8 mls to 53.0 mls on the static-aged sample and from 45.2 to 40.8 on the hot-rolled sample.

Thus, Sample 32 illustrates a preferred formulation and most synergistic lubricant.

TABLE II

Tests of Alcohols and Oleates 3 ppb of each sample mixture was added to the standard base mud for lubricity test. Test results reported as the lubricity coefficient.

Test No. 41

Instrument calibrated with water
Initial reading .33
After 1 minute .34
After 5 minutes .34

Test No. 42

Sample No. 40: 20% glycerol monooleate
20% glycerol dioleate
60% $C_1$ alcohol
Initial reading .33
After 1 minute .30
After 5 minutes .24

Test No. 43

Sample No. 41: 20% glycerol monooleate
20% glycerol dioleate
60% $C_5$ alcohol

TABLE II-continued

Tests of Alcohols and Oleates 3 ppb of each sample mixture was added to the standard base mud for lubricity test. Test results reported as the lubricity coefficient.

|  |  |
|---|---|
| Initial reading | .38 |
| After 1 minute | .36 |
| After 5 minutes | .31 |

Test No. 44

Sample No. 42: 20% glycerol monooleate
20% glycerol dioleate
60% C$_{10}$ alcohol

|  |  |
|---|---|
| Initial reading | .21 |
| After 1 minute | .20 |
| After 5 minutes | .18 |

Test No. 45

Sample No. 43: 40% Mg oleate
60% ethyl hexanol

|  |  |
|---|---|
| Initial reading | .26 |
| After 1 minute | .22 |
| After 5 minutes | .20 |

Test No. 46

Sample No. 44: 20% Mg oleate
20% glycerol dioleate
60% ethyl hexanol

|  |  |
|---|---|
| Initial reading | .26 |
| After 1 minute | .24 |
| After 5 minutes | .18 |

Test No. 47

Sample No. 45: 40% olea amide
60% ethyl hexanol

|  |  |
|---|---|
| Initial reading | .39 |
| After 1 minute | .36 |
| After 5 minutes | .30 |

Test No. 48

Sample No. 46: 40% propylyne glycol monooleate
60% ethyl hexanol

|  |  |
|---|---|
| Initial reading | .28 |
| After 1 minute | .30 |
| After 5 minutes | .33 |

Test No. 49

Sample No. 47: 20% propylyne glycol monooleate
20% glycerol dioleate
60% ethyl hexanol

|  |  |
|---|---|
| Initial reading | .35 |
| After 1 minute | .30 |
| After 5 minutes | .26 |

CONCLUSIONS

Sample Nos. 40, 41, and 42 show results of various alcohols. C$_1$ and C$_5$ alcohols show some improvement and synergistic effect in the lubricant mixture, but ethyl hexanol (C$_8$) is better as tested. C$_{10}$ alcohol is also effective as a synergistic additive in the lubricant mixture.

Sample Nos. 43, 44, 45, 46 and 47 show different types of oleates.

TABLE III

Lubricity Tests

| Coefficeint of friction | Sticking Coefficient |
|---|---|

Test No. 50
Base Mud

| After 9 minutes at 700 lbs jaw load the steel pin sheared. | After 48 min. plate stuck |  |
|---|---|---|
|  | After 58 min. | .14 |
|  | After 68 min. | .14 |
|  | After 78 min. | .14 |

Test No. 51
Base mud plus 2 ppb of Sample 32 lubricant mixture

| After 1 hour at 700 lbs jaw load = .021. | After 33 min. plate stuck |  |
|---|---|---|
|  | After 43 min. | .019 |
|  | After 53 min. | .024 |
|  | After 63 min. | .033 |
|  | After 73 min. | .053 |
|  | After 83 min. | .053 |
|  | After 93 min. | .053 |

TABLE III-continued

Lubricity Tests

| Coefficeint of friction | Sticking Coefficient |
|---|---|

Test No. 52
Base mud plus 2 ppb of Sample 33 lubricant mixture

| After 1 hour at 700 lbs jaw load = .021. | After 33 min. plate stuck |  |
|---|---|---|
|  | After 43 min. | .048 |
|  | After 53 min. | .072 |
|  | After 63 min. | .096 |
|  | After 73 min. | .096 |
|  | After 83 min. | .096 |

Test No. 53
Base mud plus 2 ppb of Sample 34 lubricant mixture

| After 1 hour at 700 lbs jaw load = .019. | After 33 min. plate stuck |  |
|---|---|---|
|  | After 43 min. | .048 |
|  | After 53 min. | .081 |
|  | After 63 min. | .091 |
|  | After 73 min. | .091 |
|  | After 83 min. | .091 |

Test No. 54
Base mud plus 2 ppb of Sample 28 lubricant mixture

| After 1 hour at 700 lbs jaw load = .028. | After 33 min. plate stuck |  |
|---|---|---|
|  | After 43 min. | .081 |
|  | After 53 min. | .115 |
|  | After 63 min. | .115 |
|  | After 73 min. | .115 |

Test No. 55
Base mud plus 2 ppb of Sample 30 lubricant mixture

| After 1 hour at 700 lbs jaw load = 021. | After 33 min. plate stuck |  |
|---|---|---|
|  | After 43 min. | .048 |
|  | After 53 min. | .076 |
|  | After 63 min. | .086 |
|  | After 73 min. | .096 |
|  | After 83 min. | .096 |
|  | After 93 min. | .096 |

TABLE IV

Comparison of Various Formulae 3 ppb of various lubricant mixtures were added to a bbl equivalent of base mud and mixed thoroughly on a blender type mixer. The test sample was then checked on the lubricity test instrument. Test results reported as the lubricity coefficient. 150 inch-pounds of torque applied to ring and block.

Test No. 56
Instrument calibrated with tap water

|  |  |
|---|---|
| Initial reading | .33 |
| After 1 minute | .34 |
| After 5 minutes | .34 |

Test No. 57
Base mud

|  |  |
|---|---|
| Initial reading | .42 |
| After 1 minute | .47 |
| After 5 minutes | .46 |

Test No. 58
Sample No. 48: Base mud plus 1.2 ppb glycerol monooleate

|  |  |
|---|---|
| Initial reading | .28 |
| After 1 minute | .27 |
| After 5 minutes | .27 |

Test No. 59
Sample No. 49: Base mud plus 1.2 ppb glycerol dioleate

|  |  |
|---|---|
| Initial reading | .28 |
| After 1 minute | .27 |
| After 5 minutes | .27 |

Test No. 60
Sample No. 50: Base mud plus 3.0 ppb ethyl hexanol

|  |  |
|---|---|
| Initial reading | .37 |
| After 1 minute | .41 |
| After 5 minutes | .42 |

Test No. 61
Sample No. 60: Base mud plus 3.0 ppb of mixture 40% glycerol monooleate and 60% ethyl hexanol

|  |  |
|---|---|
| Initial reading | .27 |
| After 1 minute | .28 |
| After 5 minutes | .28 |

Test No. 62

TABLE IV-continued
Comparison of Various Formulae 3 ppb of various lubricant mixtures were added to a bbl equivalent of base mud and mixed thoroughly on a blender type mixer. The test sample was then checked on the lubricity test instrument. Test results reported as the lubricity coefficient. 150 inch-pounds of torque applied to ring and block.

Sample No. 61: Base mud plus 3.0 ppb of mixture, 40% glycerol dioleate and 60% ethyl hexanol
- Initial reading .29
- After 1 minute .25
- After 5 minutes .23

Test No. 63

Sample No. 62: Base mud plus 3.0 ppb of mixture, 50% glycerol monooleate and 50% glycerol dioleate
- Initial reading .31
- After 1 minute .32
- After 5 minutes .32

Test No. 64

Sample No. 63: Base mud plus 3.0 ppb of mixture, 20% glycerol monooleate, 20% glycerol dioleate and 60% ethyl hexanol
- Initial reading .35
- After 1 minute .29
- After 5 minutes .22

Test No. 65

Sample No. 64: Base mud plus 3.0 ppb of mixture, 10% glycerol monooleate, 30% glycerol dioleate and 60% ethyl hexanol
- Initial reading .24
- After 1 minute .23
- After 5 minutes .21

Test No. 66

Sample No. 65: Base mud plus 3.0 ppb of mixture, 30% glycerol monooleate, 10% glycerol dioleate and 60% ethyl hexanol
- Initial reading .35
- After 1 minute .27
- After 5 minutes .25

Test No. 67

Sample No. 66: Base mud plus 3.0 ppb of mixture, 10% glycerol monooleate, 10% glycerol dioleate and 80% ethyl hexanol
- Initial reading .26
- After 1 minute .24
- After 5 minutes .21

Test No. 68

Sample No. 67: Base mud plus 3.0 ppb of mixture, 40% glycerol monooleate, 40% glycerol dioleate, and 20% ethyl hexanol
- Initial reading .26
- After 1 minute .24
- After 5 minutes .21

Test No. 69

Sample No. 68: Base mud plus 3.0 ppb of mixture, 20% glycerol monooleate, 20% glycerol dioleate and 60% isopropanol
- Initial reading .33
- After 1 minute .31
- After 5 minutes .25

Test No. 70

Sample No. 69: Base mud plus 3.0 ppb of mixture, 20% glycerol monooleate, 20% glycerol dioleate and 60% Neodal 91 - $C_{11}$ alcohol
- Initial reading .19
- After 1 minute .21
- After 5 minutes .27

Test No. 71

Sample No. 70: Base mud plus 3.0 ppb of mixture, 20% glycerol monooleate, 20% glycerol dioleate, 60% ethyl hexanol and 0.02% aromatic oil*
- Initial reading .25
- After 1 minute .20
- After 5 minutes .16

Test No. 72

Sample No. 71: Base mud plus 3.0 ppb Torq Trim
- Initial reading .22
- After 1 minute .21
- After 5 minutes .21

Test No. 73

Sample No. 72: Base mud plus 3.0 ppb Lubri-Sal
- Initial reading .42
- After 1 minute .43
- After 5 minutes .41

Test No. 74

Sample No. 73: Base mud plus 3.0 ppb Magcolube
- Initial reading .23
- After 1 minute .22
- After 5 minutes .19

Test No. 75

Sample No. 74: Base mud plus 3.0 ppb D.C. Tork Ease
- Initial reading .35
- After 1 minute .37
- After 5 minutes .37

*a synthetic essential oil containing substantial concentrations of limonene, linalyl acetate and linalool.

TABLE V

Compatibility Tests

| Sample Ident. | Low Weight Lignosulfonate Field Mud | | | | | | | | High Weight Lignosulfonate Field Mud | | | | | NaCl Base Mud | | | | Gypsum Base Mud | | | | Non-dispersed Mud | | | |
|---|---|---|---|---|---|---|---|---|---|---|---|---|---|---|---|---|---|---|---|---|---|---|---|---|---|
| | Base Mud | | | | Base plus 2 ppb Sample 32 | | | | Base Mud | | Base Mud Plus 2.0 ppb Sample 32 | | | Base Mud | | Base Mud Plus 2.0 ppb Sample 32 | | Base Mud | | Base plus 2.0 ppb Sample 32 | | Base Mud | | Base plus 2.0 ppb Sample 32 | |
| Physical State* | I | HR | SA | HR-HT | I | HR | SA | HR-HT | I | HR | I | HR | | I | HR | I | HR | I | HR | I | HR | I | HR | I | HR |
| 600 rpm | 36 | 29 | 39 | 42 | 37 | 39 | 43 | 49 | 158 | 152 | 151 | 152 | | 27 | 24 | 27 | 24 | 20 | 16 | 20 | 16 | 15 | 20 | 18 | 23 |
| 300 rpm | 24 | 19 | 25 | 27 | 29 | 24 | 27 | 31 | 87 | 82 | 86 | 83 | | 21 | 18 | 21 | 18 | 12 | 9 | 12 | 9 | 10 | 13 | 12 | 15 |
| AV, cps | 18 | 14.5 | 19.5 | 21 | 18.5 | 19.5 | 21.5 | 24.5 | 79 | 76 | 75.5 | 76 | | 13.5 | 12 | 13.5 | 12 | 10 | 8 | 10 | 8 | 7.5 | 10 | 9 | 11.5 |
| PV, cps | 12 | 10 | 14 | 15 | 13 | 15 | 16 | 18 | 71 | 70 | 65 | 69 | | 6 | 6 | 6 | 6 | 8 | 7 | 8 | 7 | 5 | 7 | 6 | 8 |
| YP, #/100 ft² | 12 | 9 | 11 | 12 | 11 | 9 | 11 | 13 | 16 | 12 | 21 | 14 | | 15 | 12 | 15 | 12 | 4 | 2 | 4 | 2 | 5 | 6 | 6 | 7 |
| 10 Sec. Gel | 7 | 5 | 4 | 4 | 7 | 4 | 4 | 3 | 6 | 5 | 5 | 5 | | 5 | 5 | 7 | 5 | 3 | 2 | 3 | 2 | 3 | 4 | 2 | 3 |
| 10 Min. Gel | 13 | 19 | 42 | 35 | 15 | 23 | 27 | 39 | 17 | 13 | 17 | 16 | | 17 | 13 | 18 | 13 | 4 | 4 | 4 | 3 | 17 | 11 | 19 | 15 |
| pH | 12.1 | 12.0 | 10.5 | 10.7 | 12.1 | 11.9 | 10.3 | 10.5 | 11.8 | 11.2 | 11.4 | 11.0 | | 7.1 | 6.9 | 7.1 | 6.9 | 12.0 | 11.1 | 12.0 | 10.9 | 8.3 | 8.2 | 8.3 | 8.1 |
| API filtrate, cc | 9.0 | | 58.8 | 45.2 | | 9.2 | 53.0 | 40.8 | | 5.2 | | 5.4 | | | | | | | 8.6 | | 9.0 | | | | |
| H.T.H.P. filtrate, cc at 300° F. | | | | | | | | | 16.3 | | | | | 10.2 | | | | | | | | | | | |
| Mud Weight ppg | 10.2 | | | | | | | | | | | | | | | | | | 360 | | | | | | |
| Calcium, ppg | | | | | | | | | | | | | | | | | | 8.7 | | | | | | | |
| Wt., ppg | | | | | | | | | | | | | | | | | | | | | | | 8.6 | | |

Lubricity Test

Lubricity Data

| | | | | | | | | | | | | | | | | | | | | | | | | | |
|---|---|---|---|---|---|---|---|---|---|---|---|---|---|---|---|---|---|---|---|---|---|---|---|---|---|
| Initial reading | .40 | .34 | .34 | | .28 | .24 | .36 | .28 | | .28 | | .26 | | | .24 | | .20 | | .26 | | .24 | | .42 | | .12 |
| After 1 minute | .42 | .36 | .38 | | .24 | .24 | .22 | .26 | | .28 | | .24 | | | .22 | | .18 | | .28 | | .22 | | .46 | | .12 |
| After 5 minutes | .44 | .40 | .44 | | .22 | .22 | .18 | .22 | | .28 | | .22 | | | .26 | | .18 | | .28 | | .22 | | .46 | | .10 |

Falex Tests:
Hot-rolled base - steel pin sheared at 700 lbs.; Hot-rolled base + 2 ppb Sample 32 - ran 1 hour at 700 lbs.; 133 teeth take up
Base mud would not stick after 2 hours Base; hot-rolled shear type failure at 600 lbs.; Base + 2 ppb Sample 32; hot-rolled - ran 1 hour at 700 lbs, 13 teeth take up
Base mud would not stick after 2 hours Stick-O-Meter: Base mud would not after 2 hours Base; hot-rolled; steel pin sheared at 250 lbs. Base + 2 ppb Sample 32; hot-rolled; steel pin sheared after 43 minutes at 700 lbs.
Base mud would not stick after 2 hours Composition:
350 cc Saturated NaCl Solution
15 ppb Attapulgite clay
3 ppb Starch
10 ppb Dixie Bond Clay 350 cc tap water
20 ppb bentonite clay
5 ppb chrome lignosulfonate thinner
8 ppb gypsum
1.5 ppb caustic
2 ppb pregelatinized starch 350 cc tap water
10 ppb bentonite
0.05 ppb acrylate copolymer bentonite extenders

*Physical State
I—Initial
HR—Hot-Roll 16 hours at 150° F.
SA—Static-aged 96 hours at 300° F.
HR-HT—Hot-roll 96 hours at 250° F.

TABLE VI

Lubricity Tests[1]

| Sample | Base Mud[2] | Sample 32[3] | Torq-Trim[a] | Magcolube[b] | Lubri-Sal[c] |
|---|---|---|---|---|---|
| Initial | 0.32 | .20 | .22 | .24 | .30 |
| 1 Minute | 0.38 | .14 | .20 | .22 | .30 |
| 5 Minute | 0.40 | .12 | .16 | .16 | .24 |

Stick-O-Meter

| | Base Mud | | Sample 32[3] | | Torq-Trim | | Lubri-Sal | |
|---|---|---|---|---|---|---|---|---|
| Time Min. | Fluid Loss Mls. | Torque In.-Lbs. | Fluid Loss Mls. | Torque In.-Lbs. | Fluid Loss Mls. | Torque In.-Lbs. | Fluid Loss Mls. | Torque In.-Lbs. |
| 30 | 39.8 | — | 38.2 | — | 34.0 | — | 54.4 | — |
| 33 | 41.6 | — | 39.6 | — | 36.2 | — | 57.6 | — |
| 38 | 43.0 | — | 42.4 | — | 38.4 | — | 62.8 | — |
| 48 | 45.4 | Stick | 46.6 | — | 41.4 | — | 72.8 | — |
| 58 | 46.6 | 150 | 49.2 | — | 43.6 | — | 79.6 | — |
| 68 | 47.4 | 150 | 51.2 | Stick | 46.2 | Stick | 82.6 | Stick |
| 78 | 48.2 | 150 | 52.6 | 20 | 47.8 | Unstick | 84.6 | 40 |
| 88 | | | 53.6 | 30 | 49.4 | Stick | 86.0 | 50 |
| 98 | | | 54.8 | 35 | 50.6 | 45 | 87.0 | 70 |
| 108 | | | 55.8 | 35 | 51.8 | 45 | 88.4 | 70 |
| 118 | | | 57.0 | 35 | 52.8 | 45 | 89.2 | 70 |

Rheology
Base Mud is Gyp Field Mud from Denmark

| Sample | Base | | Base + Sample 32[3] | | Base + Torq-Trim | | Base + Lubri-Sal | | Base + Magcolube | |
|---|---|---|---|---|---|---|---|---|---|---|
| Physical State[4] | I | HR | I | HR | I | HR | I | HR | I | HR |
| 600 RPM | 46 | 42 | 47 | 42 | 46 | 45 | 48 | 43 | 47 | 47 |
| 300 RPM | 26 | 24 | 28 | 24 | 26 | 26 | 28 | 23 | 27 | 27 |
| AV, cps | 23 | 21 | 23.5 | 21 | 23 | 22.5 | 24 | 21.5 | 23.5 | 23.5 |
| PV, cps | 20 | 18 | 19 | 18 | 20 | 19 | 20 | 20 | 20 | 20 |
| YP, #/100 ft$^2$ | 6 | 6 | 9 | 6 | 6 | 7 | 8 | 3 | 7 | 7 |
| 10 Sec. Gel | 2 | 3 | 2 | 3 | 2 | 3 | 3 | 2 | 4 | 4 |
| 10 Min. Gel | 6 | 4 | 6 | 5 | 4 | 4 | 6 | 5 | 5 | 7 |
| pH | 12.7 | 12.7 | 12.7 | 12.5 | 12.6 | 12.6 | 12.7 | 12.2 | 12.7 | 11.9 |
| API filtrate, (mls) | | 4.6 | | 5.4 | | 5.2 | | 5.0 | | 5.4 |
| HT-HP filtrate, (mls) @ 300° F. | | 34.0 | | 31.0 | | 32.8 | | 33.6 | | 27.2 |

[a] Appears to consist of ethoxylated fatty acid esters in isopropyl alcohol.
[b] Appears to consist of alkanolamides of fatty acid esters.
[c] For composition see U. S. Pat. No. 4,181,617.
[1] Results expressed as lubricity coefficient as measured by ring and lubricity test instrument.
[2] Laboratory base mud (9.4 ppg density) -
 350 cc tap water
 10 ppb (gm/350 cc) NaCl
 10 ppb bentonite clay
 20 ppb Dixie Bond clay
 15 ppb CaCO$_3$ particles
 14 ppb Barite
 10.2 ppg mud weight
[3] Sample 32 lubricant plus 0.02% of a preferred masking agent.
[4] Physical State:
 I = Initial
 HR = Hot-Rolled 16 hours at 150° F.

EXAMPLE 1

In an Alaskan test well the torque and drag increased as the 45° directional well was drilled. Finally, at 11,925 feet it was impossible to pull the drill string high enough to connect the next section of drill pipe although the drill string was not quite stuck. Three hundred barrels of the drilling mud treated by mixing with 2 ppb of Lubricant 32 were pumped into the well down and around the drill collars. The drill string was quickly freed and drilling resumed. The remainder of the drilling mud was treated with 1 ppb of Lubricant 32 by thoroughly mixing the lubricant with the mud and the well was drilled to its goal of 12,269 feet total depth (TD) with no further drag or sticking problems. However, the first logging attempt was unsuccessful when the logging tools hung up at about 9,100 feet. Drill pipe was run back into the well and reciprocated in the well as mud treated with an additional 0.5 ppb of Lubricant 32 was circulated in the well. The draw works load decreased by 50,000 pounds as the drill pipe was reciprocated and treated mud circulated. On the next logging attempt, the logging tools were liberally coated with Lubricant 32 and the tools ran into the well to the TD with little difficulty.

EXAMPLE 2

In a South Louisiana test, a high angle well at 11,690 feet depth encountered high torque and drag which led to twisting off and parting of the pipe. The "fish" which is the lower section of the drill string which had twisted off was on bottom for over six (6) hours. Along with fishing for the drill string, the drilling mud was treated with the Lubricant 32, to reduce drag and assist in recovery of the "fish". After conditioning with Lubricant 32, the fish was readily speared and recovered with minimum drag. Drilling continued with reduced torque and drag.

EXAMPLE 3

In an offshore Louisiana well deviated at 22° and at a depth of 10,200 feet, the drill string had high torque while drilling with excess sticking and high drag on trips. The mud was treated with 2 ppb of Lubricant 32. After the first mud circulation through the well there was a significant drop in the amperage pulled by the rotary table motor. Cuttings were firmer with less sticking of shale on the bit and stabilizers and the drill penetration rate increased 5 feet/hour.

EXAMPLE 4

In an offshore Texas well at 6,000 feet with 3,000 feet of open hole, excess sticking and drag were encountered while making drill string connections and on trips. The mud was treated with 2 ppb of Lubricant 32 and 10 gallons (about 70 pounds) of Lubricant 32 were added during each tour. The high torque and drag decreased significantly and sticking was no longer noticed.

We claim:

1. A composition for reducing the frictional resistance developed in an aqueous fluid between the surface of a moving metal article and an adjacent surface, said composition consisting essentially of:
   an odor masking agent, a mixture of substantially equal amounts of glycerol monooleate and glycerol dioleate, and
   an alcohol or mixture of alcohols having 7 to 10 carbon atoms;
   wherein the concentration of said odor masking agent in said composition is up to about 5 percent by weight of said composition, the concentration of said oleate mixture in said composition is in the range of from about 5 to about 60 percent by weight of said composition and the concentration of said alcohol in said composition is in the range of from about 10 to about 90 percent by weight of said composition.

2. The composition of claim 1 wherein said alcohol is substantially linear.

3. The composition of claim 1 wherein the concentration of said alcohol in said composition is at least equal to the concentration of said oleate mixture in said composition.

4. The composition of claim 3 wherein said alcohol is ethyl hexanol.

5. The composition of claim 4 wherein the concentration of said ethyl hexanol is about 60 percent by weight, the concentration of said glycerol monooleate is about 20 percent by weight and the concentration of said glycerol dioleate is about 20 percent by weight.

6. A composition for reducing the frictional resistance between the surface of a moving metal article and an adjacent surface, said composition consisting essentially of:
   an aqueous fluid containing an additive in an amount of up to about 5 percent by weight of said aqueous fluid, said additive consisting essentially of,
   an odor masking agent present in said additive in an amount of up to about 5 percent by weight of said additive,
   a mixture of substantially equal amounts of glycerol monooleate and glycerol dioleate, said mixture being present in said additive in an amount in the range of from about 5 to about 60% by weight of said composition, and
   an alcohol or mixture of alcohols having 7 to 10 carbon atoms said alcohol being present in said additive in an amount in the range of from about 10 to about 90 percent by weight of said additive.

7. The composition of claim 6 wherein said alcohol is ethyl hexanol.

8. The composition of claim 7 wherein the concentration of said ethyl hexanol is about 60 percent by weight, the concentration of said glycerol monooleate is about 20 percent by weight and the concentration of said glycerol dioleate is about 20 percent by weight.

9. A process for reducing the frictional resistance developed in an aqueous fluid between the surface of a moving drill stem and an wall of a borehole comprising adding to said aqueous fluid a lubricating composition in an amount of up to about 5 percent by weight of said aqueous fluid, said lubricating composition consisting essentially of:
   an odor masking agent, a mixture of substantially equal amounts of glycerol monooeleate and glycerol dioleate, and
   an alcohol or mixture of alcohols having 7 to 10 carbon atoms;
   wherein the concentration of said odor masking agent in said composition is up to about 5 percent by weight of said composition, the concentration of said oleate mixture in said composition is in the range of from about 5 to about 60 percent by weight of said composition and the concentration of said alcohol in said composition is in the range of from about 10 to about 90 percent by weight of said composition.

10. The process of claim 9 wherein said alcohol is substantially linear.

11. The process of claim 9 wherein said alcohol is ethyl hexanol.

12. The process of claim 11 wherein the concentration of said ethyl hexanol is about 60 percent by weight, the concentration of said glycerol monooleate is about 20 percent by weight and the concentration of said glycerol dioleate is about 20 percent by weight.

* * * * *

UNITED STATES PATENT AND TRADEMARK OFFICE
CERTIFICATE OF CORRECTION

PATENT NO. : 4,409,108

DATED : October 11, 1983

INVENTOR(S) : Carney et al

It is certified that error appears in the above-identified patent and that said Letters Patent is hereby corrected as shown below:

Table V, line 24, the fifth entry reads ".36", the entry should read --.26--

Table V, Column heading "High Weight Lignosulfonate Field Mud", Line 33 reads "2 hours", the line should read -- after 2 hours--

Signed and Sealed this

Twentieth Day of December 1983

[SEAL]

Attest:

GERALD J. MOSSINGHOFF

Attesting Officer     Commissioner of Patents and Trademarks